(12) United States Patent
Chinzei et al.

(10) Patent No.: US 11,759,769 B2
(45) Date of Patent: Sep. 19, 2023

(54) EXHAUST GAS PURIFICATION DEVICE

(71) Applicants: Isao Chinzei, Toyota (JP); Seiji Nakahigashi, Toyota (JP); Takumi Tojo, Toyota (JP); Masahide Miura, Toyota (JP); Nobuyuki Takagi, Toyota (JP); Yoshiteru Yazawa, Toyota (JP); Sho Hoshino, Kakegawa (JP); Minoru Ito, Kakegawa (JP); Naoto Fujita, Kakegawa (JP); Tomomasa Aikawa, Kakegawa (JP)

(72) Inventors: Isao Chinzei, Toyota (JP); Seiji Nakahigashi, Toyota (JP); Takumi Tojo, Toyota (JP); Masahide Miura, Toyota (JP); Nobuyuki Takagi, Toyota (JP); Yoshiteru Yazawa, Nagoya (JP); Sho Hoshino, Kakegawa (JP); Minoru Ito, Kakegawa (JP); Naoto Fujita, Kakegawa (JP); Tomomasa Aikawa, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/495,881

(22) Filed: Oct. 7, 2021

(65) Prior Publication Data
US 2022/0118428 A1  Apr. 21, 2022

(30) Foreign Application Priority Data

Oct. 19, 2020  (JP) ................................ 2020-175554

(51) Int. Cl.
*B01J 23/58* (2006.01)
*B01D 53/94* (2006.01)
(Continued)

(52) U.S. Cl.
CPC ............ *B01J 23/58* (2013.01); *B01D 53/945* (2013.01); *B01J 35/04* (2013.01);
(Continued)

(58) Field of Classification Search
CPC . B01J 23/58; B01J 23/10; B01J 35/023; B01J 37/0248; B01J 27/053; B01J 35/04;
(Continued)

(56) References Cited

U.S. PATENT DOCUMENTS 5,677,258 A * 10/1997 Kurokawa ............ F01N 3/0814
  422/177
9,937,487 B2 *  4/2018 Miura .................. B01D 53/945
(Continued)

FOREIGN PATENT DOCUMENTS

JP      2018108556 A      7/2018
JP      2020054982 A      4/2020
(Continued)

*Primary Examiner* — Lessanework Seifu
(74) *Attorney, Agent, or Firm* — Dickinson Wright, PLLC

(57) ABSTRACT

Provided is an exhaust gas purification device that allows improving an exhaust gas purification performance. An exhaust gas purification device of the present disclosure includes a substrate and a catalyst layer disposed on the substrate. The catalyst layer contains a porous carrier, a catalytic metal that is supported by the porous carrier and belongs to platinum group, an alkaline earth metal supported by the porous carrier, and an alkaline earth metal not supported by the porous carrier. At least a part of the alkaline earth metal supported by the porous carrier is supported inside the porous carrier.

1 Claim, 5 Drawing Sheets

(51) Int. Cl.
  *B01J 35/04* (2006.01)
  *F01N 3/28* (2006.01)

(52) U.S. Cl.
  CPC ............... *B01D 2255/1021* (2013.01); *B01D 2255/1023* (2013.01); *B01D 2255/1025* (2013.01); *B01D 2255/2042* (2013.01); *B01D 2255/9155* (2013.01); *F01N 3/2803* (2013.01); *F01N 2370/02* (2013.01)

(58) Field of Classification Search
  CPC ............... B01J 35/1014; B01J 35/1019; B01J 37/0236; B01J 37/038; B01J 37/04; B01J 37/082; B01J 33/00; B01D 53/945; B01D 2255/2042; B01D 2255/9155; B01D 2255/9207; B01D 2255/1021; B01D 2255/1023; B01D 2255/1025; B01D 2255/908; B01D 53/9413; B01D 2257/404; B01D 2258/01; F01N 3/2803; F01N 2370/02; F01N 2330/06; F01N 3/2828; F01N 3/10

USPC ........................................................ 422/180
See application file for complete search history.

(56) References Cited

U.S. PATENT DOCUMENTS

| | | | |
|---|---|---|---|
| 2005/0031501 A1* | 2/2005 | Kawai | B01J 23/58 422/177 |
| 2006/0142151 A1* | 6/2006 | Taki | B01D 53/945 502/304 |
| 2015/0045209 A1 | 2/2015 | Fujimura et al. | |
| 2020/0030780 A1 | 1/2020 | Oishi et al. | |
| 2021/0277814 A1 | 9/2021 | Kawamura et al. | |

FOREIGN PATENT DOCUMENTS

| | | |
|---|---|---|
| WO | WO2013065421 A1 | 5/2013 |
| WO | 2018190300 A1 | 10/2018 |

* cited by examiner

EXHAUST GAS PURIFICATION DEVICE

CROSS REFERENCE TO RELATED APPLICATIONS

The present application claims priority from Japanese patent application JP 2020-175554 filed on Oct. 19, 2020, the entire content of which is hereby incorporated by reference into this application.

BACKGROUND

Technical Field

The present disclosure relates to an exhaust gas purification device that includes a substrate and a catalyst layer that is disposed on the substrate and contains a porous carrier on which a catalytic metal is supported.

Description of Related Art

An exhaust gas discharged from an internal combustion engine of an automobile or the like contains a harmful component such as CO (carbon monoxide), HC (hydrocarbon), or NOx (nitrogen oxide). To remove the harmful components from the exhaust gas, there has been used an exhaust gas purification device that includes a substrate and a catalyst layer that is disposed on the substrate and contains a porous carrier on which a catalytic metal is supported.

For the exhaust gas purification device, there has been a problem, what is called HC poisoning, that unremoved HC in the exhaust gas is adsorbed to the catalytic metal contained in the catalyst layer and covers its surface, thus reducing purification activity of the catalyst layer. To solve the problem of HC poisoning, conventionally, there has been known a technique that suppresses the HC adsorption to the catalytic metal by using an alkaline earth metal having an electron donating property as a promotor for a catalyst layer, thereby suppressing the reduction of a catalytic activity of the catalyst layer.

For example, JP 2020-054982 A discloses an exhaust gas purification device that includes a catalyst layer in which a catalytic metal that is Pt (platinum) and an alkaline earth metal are supported by a porous carrier in a highly dispersed state with a high correlation in existence position for a purpose of suppressing HC poisoning. For example, WO 2018/190300 discloses an exhaust gas purification device that includes a catalyst layer in which a catalytic metal belonging to the platinum group and an alkaline earth metal are supported by a porous carrier in a highly dispersed state with a high correlation in existence position, thereby causing the alkaline earth metal to act as a promotor at a high level.

SUMMARY

However, in the situation where the improvement of purification performance of the exhaust gas purification device is desired in accordance with the tightened emission regulations, the usage of noble metal as an active spot of purification reaction in a catalyst layer has increased, and in association with this, the usage of alkaline earth metal necessary for suppressing the HC poisoning has increased. Accordingly, in the conventional exhaust gas purification device, the alkaline earth metal is unevenly distributed in the porous carrier of the catalyst layer, and the reduction of dispersion degree of the alkaline earth metal cannot be suppressed, thus possibly failing to effectively suppress the HC poisoning. In view of this, there has been desired an exhaust gas purification device that allows effectively suppressing the HC poisoning to improve the exhaust gas purification performance.

The present disclosure has been made in view of such an aspect, and provides an exhaust gas purification device that can improve an exhaust gas purification performance.

To solve the above-described problem, an exhaust gas purification device of the present disclosure comprises a substrate and a catalyst layer disposed on the substrate. The catalyst layer contains a porous carrier, a catalytic metal that is supported by the porous carrier and belongs to platinum group, an alkaline earth metal supported by the porous carrier, and an alkaline earth metal not supported by the porous carrier. At least a part of the alkaline earth metal supported by the porous carrier is supported inside the porous carrier.

Effect

According to the present disclosure, the exhaust gas purification performance can be improved.

DETAILED DESCRIPTION OF THE EMBODIMENTS

The following describes embodiments according to an exhaust gas purification device of the present disclosure.

Figure 1:
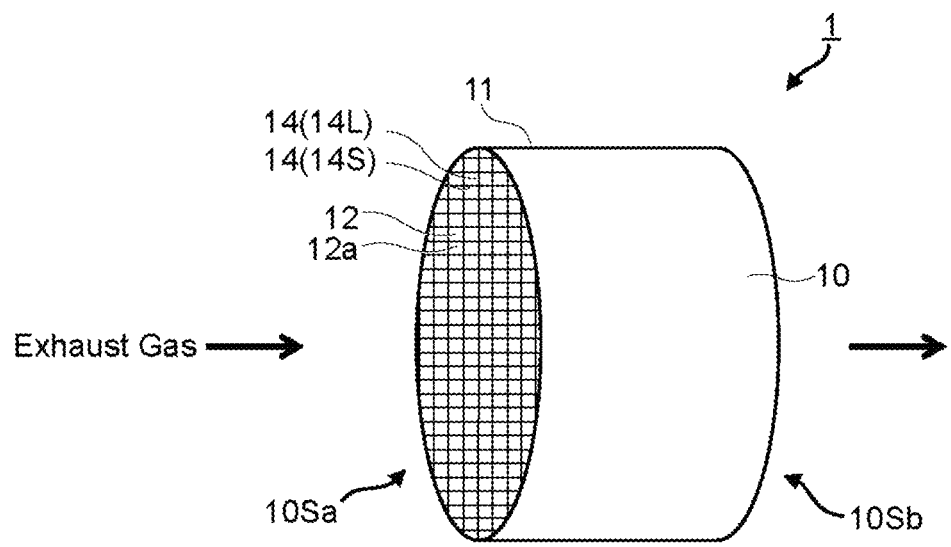
FIG. 1 is a schematic perspective view of an exhaust gas purification device according to a first embodiment.
Figure 2:
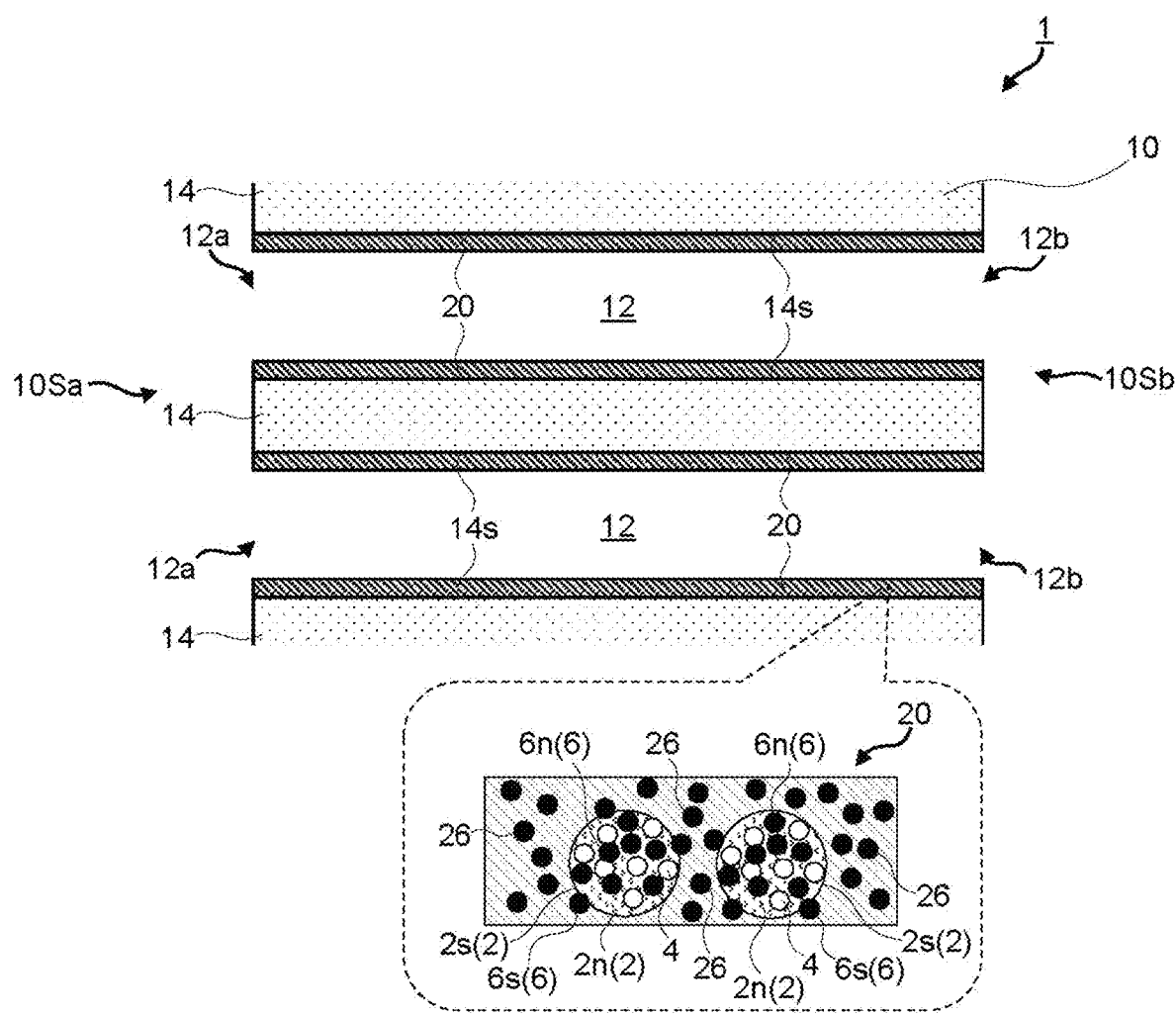
FIG. 2 is a schematic cross-sectional view of a cross-sectional surface perpendicular to an extending direction of a cell in the exhaust gas purification device illustrated in FIG. 1, and illustrates an enlarged view of a cross-sectional surface of a catalyst layer together.

First, an outline of the embodiments will be described exemplifying an exhaust gas purification device according to a first embodiment. FIG. 1 is a schematic perspective view of the exhaust gas purification device according to the first embodiment. FIG. 2 is a schematic cross-sectional view of a cross-sectional surface perpendicular to an extending direction of a cell in the exhaust gas purification device illustrated in FIG. 1, and illustrates an enlarged view of a cross-sectional surface of a catalyst layer together.

As illustrated in FIG. 1 and FIG. 2, an exhaust gas purification device 1 according to the first embodiment is a three-way catalyst of what is called a straight flow type. The exhaust gas purification device 1 includes a honeycomb substrate 10 (substrate) and a catalyst layer 20 disposed on the honeycomb substrate 10. The honeycomb substrate 10 is a substrate that includes a cylindrically-shaped frame part 11 and partition walls 14 dividing the space inside the frame part 11 in a honeycomb shape. The frame part 11 and the partition walls 14 are integrally formed. The partition walls 14 are porous bodies that define a plurality of cells 12 extending from a flow-in side end surface 10Sa to a flow-out side end surface 10Sb of the honeycomb substrate 10. The partition walls 14 include a plurality of wall portions 14L disposed to be mutually separated and parallel, and a plurality of wall portions 14S disposed to be orthogonal to the plurality of wall portions 14L and mutually separated and parallel. The plurality of wall portions 14L and the plurality of wall portions 14S are arranged such that the plurality of cells 12 have square-shaped cross-sectional surfaces perpendicular to an extending direction. The partition walls 14 make a grid pattern in a cross-sectional surface perpendicular to an extending direction. The plurality of cells 12 are mutually adjacent across the partition walls 14, and flow-in side ends 12a and flow-out side ends 12b are open. The extending direction of the partition wall 14 is approximately the same as an axial direction of the honeycomb substrate 10, and the extending direction of the cell 12 is approximately the same as the extending direction of the partition wall 14.

As illustrated in FIG. 2, the catalyst layer 20 is disposed on a surface 14s on the cell 12 side of the partition wall 14 so as to occupy the entire area in the axial direction (extending direction of partition wall 14) of the honeycomb substrate 10. As illustrated in the enlarged view in FIG. 2, the catalyst layer 20 contains a powder containing porous carrier secondary particles 2 (porous carrier), a powder containing catalyst metal particles 4 (catalytic metal belonging to the platinum group) that contains at least one of Pd and Pt supported by the porous carrier secondary particles 2, a powder containing barium sulfate secondary particles 6 (sulfate of Ba) supported by the porous carrier secondary particles 2, and a powder containing barium sulfate secondary particles 26 not supported by the porous carrier secondary particles 2. The catalyst metal particles 4 are supported on insides 2n of the porous carrier secondary particles 2. In other words, the catalyst metal is supported inside the porous carrier. At least a part of the barium sulfate secondary particles 6 supported by the porous carrier secondary particles 2 are supported on the insides 2n of the porous carrier secondary particles 2. In other words, at least a part of the alkaline earth metal supported by the porous carrier is supported inside the porous carrier. Remaining barium sulfate secondary particles 6s are supported on outer surfaces 2s of the porous carrier secondary particles 2. While not illustrated, the catalyst layer 20 further includes an OSC material.

A weight ratio of the barium sulfate secondary particles 6 supported by the porous carrier secondary particles 2 relative to a total weight of the porous carrier secondary particles 2, the catalyst metal particles 4, and the barium sulfate secondary particles 6 supported by the porous carrier secondary particles 2 is in a range of 7 weight % or more and 11 weight % or less. A proportion of barium sulfate secondary particles 6n supported on the insides 2n of the porous carrier secondary particles 2 (the sulfate supported inside the porous carrier) in the barium sulfate secondary particles 6 supported by the porous carrier secondary particles 2 is in a range of 70 weight % or more. A total weight of the barium sulfate secondary particles 6 supported by the porous carrier secondary particles 2 and the barium sulfate secondary particles 26 not supported by the porous carrier secondary particles 2 is four times or more of the weight of the catalyst metal particles 4.

According to the exhaust gas purification device of the embodiment, as the exhaust gas purification device 1 according to the first embodiment, at least a part of the alkaline earth metal supported by the porous carrier is supported on the inside of the porous carrier in the catalyst layer. Therefore, the alkaline earth metal can be effectively acted as a promotor to the catalytic metal supported on the inside of the porous carrier, and it can be suppressed that the uneven distribution of the alkaline earth metal on the outer surface of the porous carrier causes the reduction in heat resistance of the constituent material, such as an OSC material, of the catalyst layer, resulting in deterioration of the constituent material and the catalytic metal. The catalyst layer contains the alkaline earth metal not supported by the porous carrier in addition to the alkaline earth metal supported by the porous carrier. Therefore, the action of the promotor insufficiently provided by only the alkaline earth metal supported by the porous carrier can be compensated by the alkaline earth metal not supported by the porous carrier. Accordingly, the HC poisoning can be effectively suppressed, and the exhaust gas purification performance can be improved. Compared with the case where the alkaline earth metal is not supported on the inside of the porous carrier, the usage of the alkaline earth metal can be reduced.

According to the exhaust gas purification device of the embodiment, as the exhaust gas purification device 1 according to the first embodiment, when the catalyst layer contains the alkaline earth metal supported by the porous carrier as sulfate of the alkaline earth metal supported by the porous carrier, and contains the alkaline earth metal not supported by the porous carrier as sulfate of the alkaline earth metal not supported by the porous carrier, the alkaline earth metal can be fixed to the porous carrier as an insoluble material (sulfate). This is because, when the sulfate of the alkaline earth metal is sulfate of Ba, it has the significantly high melting point and is stable, and solubility to water is extremely low.

Furthermore, in this case, when the weight ratio of the sulfate of the alkaline earth metal supported by the porous carrier relative to the total weight of the porous carrier, the catalytic metal, and the sulfate of the alkaline earth metal supported by the porous carrier is in a range of 7 weight % or more and 11 weight % or less, the proportion of the sulfate supported on the inside of the porous carrier in the sulfate of the alkaline earth metal supported by the porous carrier is in a range of 70 weight % or more, and the total weight of the sulfate of the alkaline earth metal supported by the porous carrier and the sulfate of the alkaline earth metal not supported by the porous carrier is four times or more of the weight of the catalytic metal, the uneven distribution of the sulfate of the alkaline earth metal on the outer surface of the porous carrier can be effectively suppressed, and the action as the promotors of both the alkaline earth metal supported by the porous carrier and the alkaline earth metal not supported by the porous carrier can be significantly provided to the catalytic metal. Accordingly, the HC poisoning can be especially effectively suppressed, and the exhaust gas purification performance can be significantly improved.

Subsequently, the configuration of the exhaust gas purification device according to the embodiment will be described in detail.

1. Catalyst Layer

The catalyst layer contains a porous carrier, a catalytic metal that is supported by the porous carrier and belongs to platinum group, an alkaline earth metal supported by the porous carrier, and an alkaline earth metal not supported by the porous carrier.

(1) Porous Carrier

The porous carrier is usually present as a powder containing secondary particles formed of aggregated primary particles.

The catalyst layer may contain a non-supporting carrier which contains the same materials as those of the porous carrier, and by which the catalytic metal or the alkaline earth metal are not supported. This is because the thermostability of the catalyst layer is increased. The non-supporting carrier is usually present as a powder containing secondary particles formed of aggregated primary particles.

While a specific surface area of the porous carrier particles is not specifically limited insofar as the specific surface area is enough to support the catalytic metal and the alkaline earth metal, the specific surface area may be, for example, in a range of 50 $m^2/g$ or more and 500 $m^2/g$ or less, and is 200 $m^2/g$ or more and 400 $m^2/g$ or less in some embodiments. This is because advantages in heat resistance and structural stability are provided. While an average particle diameter of the porous carrier particles is not specifically limited, the average particle diameter of the porous carrier particles may be, for example, in a range of 1 nm or more and 500 nm or less, and is in a range of 5 nm or more and 300 nm or less in some embodiments. The average particle diameter of the porous carrier particles means, for example, an average value of particle diameters obtained by a method of observing the catalyst layer by a transmission electron microscope (TEM) or the like, or an average value of particle diameters obtained by an X-ray diffraction method. The specific surface area and the average particle diameter of the non-supporting carrier particles are the same as the specific surface area and the average particle diameter of the porous carrier.

While the material of the porous carrier is not specifically limited insofar as the material is an inorganic compound that can support the catalytic metal and the alkaline earth metal, for example, $Al_2O_3$ (alumina), $ZrO_2$ (zirconia), $CeO_2$ (ceria), $SiO_2$ (silica), $TiO_2$ (titania), solid solutions of them (for example, CZ composite oxide (ceria-zirconia composite oxide)), and a combination of them may be used, and $Al_2O_3$, $ZrO_2$, or the like is used in some embodiments. This is because the specific surface area is large and the heat resistance is high. The material of the non-supporting carrier is the same as the material of the porous carrier.

(2) Catalytic Metal Belonging to Platinum Group Supported by Porous Carrier

The catalytic metal belonging to the platinum group supported by the porous carrier is at least one kind of metal that can function as an oxidation catalyst or a reduction catalyst and belongs to the platinum group. The catalytic metal is usually present as a powder containing catalyst metal particles.

While the type of the catalytic metal is not specifically limited insofar as the catalytic metal belongs to the platinum group, for example, at least one of Pt (platinum), Pd (palladium), Rh (rhodium), or the like may be used, at least one of Pt, Pd, or the like may be used, and at least one of Pt or the like is used in some embodiments. An alloy of two or more of these may be used.

While not specifically limited, the average particle diameter of the catalyst metal particles is, for example, in a range of 1 nm or more and 100 nm or less, may be in a range of 1 nm or more and 50 nm or less, may be in a range of 1 nm or more and 20 nm or less, and is 1 nm or more and 10 nm or less in some embodiments. This is because the average particle diameter equal to or less than the upper limits of these ranges allows increasing the contacted area with the exhaust gas. The average particle diameter of the catalyst metal particles means an average value of the particle diameters obtained by a method of observing the catalyst layer by TEM or the like.

While not specifically limited, the weight ratio of the catalytic metal relative to the total weight of the porous carrier, the catalytic metal, and the sulfate of the alkaline earth metal supported by the porous carrier is, for example, in a range of 0.5 weight % or more and 5 weight % or less in some embodiments. This is because the weight ratio equal to or more than the lower limit of this range allows sufficiently improving the exhaust gas purification performance. Additionally, the weight ratio equal to or less than the upper limit of this range allows the cost reduction.

While not specifically limited, the weight per liter of substrate volume of the catalytic metal may be, for example, in a range of 0.1 g/L or more and 5 g/L or less, and is in a range of 0.2 g/L or more and 2 g/L or less in some embodiments. This is because the weight equal to or more than the lower limits of these ranges allows sufficiently improving the exhaust gas purification performance. Additionally, the weight equal to or less than the upper limits of these ranges allows the cost reduction. The substrate volume means a bulk volume including the volume of cells (voids) inside the substrate in addition to the net volume of the substrate. The weight per liter of substrate volume of the catalytic metal means a value obtained by dividing the weight of the catalytic metal contained in the catalyst layer by the volume (unit: liter) of a part in the axial direction of the substrate having the same length in the axial direction as the length in the extending direction of the catalyst layer.

(3) Alkaline Earth Metal Supported by Porous Carrier

While not specifically limited, the alkaline earth metal supported by the porous carrier is present as, for example, a sulfate of an alkaline earth metal supported by the porous carrier. At least a part of the alkaline earth metal supported by the porous carrier is supported inside the porous carrier.

While the kind of the alkaline earth metal supported by the porous carrier is not specifically limited, for example, Ba (barium), Sr (strontium), or Ca (calcium) may be used, and Ba, Sr, or the like is used in some embodiments. This is because these alkaline earth metals provide high performances as promotors. The kind of the alkaline earth metal is especially Ba, or the like in some embodiments. This is because barium sulfate ($BaSO_4$) as sulfate of Ba has the extremely high melting point and is stable, and the solubility to water is extremely low.

(4) Alkaline Earth Metal not Supported by Porous Carrier

While not specifically limited, the alkaline earth metal not supported by the porous carrier is present as, for example, a sulfate of an alkaline earth metal not supported by the porous carrier.

The kind of the alkaline earth metal not supported by the porous carrier is the same as the kind of the alkaline earth metal supported by the porous carrier, thus omitting the explanation here.

(5) Catalyst Layer

The catalyst layer contains the alkaline earth metal supported by the porous carrier as a sulfate of the alkaline earth metal supported by the porous carrier, and contains the alkaline earth metal not supported by the porous carrier as a sulfate of the alkaline earth metal not supported by the porous carrier in some embodiments. The sulfate of the alkaline earth metal is present as, for example, a powder containing secondary particles formed of aggregated primary particles. At least a part of the sulfate of the alkaline earth metal supported by the porous carrier is supported inside the porous carrier.

While not specifically limited, the kind of the sulfate of the alkaline earth metal may be, for example, the sulfate of Ba, the sulfate of Sr, or the sulfate of Ca, or the like and is the sulfate of Ba, the sulfate of Sr, or the like in some embodiments. The kind of the sulfate is especially the sulfate of Ba (barium sulfate) or the like in some embodiments.

An average particle diameter of particles of the sulfate of the alkaline earth metal may be, for example, in a range of 30 nm or less. This is because the especially high performance as the promotor can be provided. The average particle diameter of the particles of the sulfate of the alkaline earth metal means an average value of particle diameters obtained by, for example, the X-ray diffraction method.

The catalyst layer may be one in which the sulfate of the alkaline earth metal is the sulfate of Ba, a weight ratio of the sulfate of the alkaline earth metal supported by the porous carrier relative to the total weight of the porous carrier, the catalytic metal, and the sulfate of the alkaline earth metal supported by the porous carrier is in a range of 7 weight % or more and 11 weight % or less, and a proportion of the sulfate supported inside the porous carrier in the sulfate of the alkaline earth metal supported by the porous carrier is in a range of 70 weight % or more. This is because, with the weight ratio of the sulfate of the alkaline earth metal supported by the porous carrier equal to or more than the lower limit of this range and the proportion of the sulfate supported inside the porous carrier in the sulfate in this range, the action of the alkaline earth metal as the promotor can be especially effectively provided to the catalytic metal supported inside the porous carrier. Additionally, with the weight ratio of the sulfate of the alkaline earth metal supported by the porous carrier equal to or less than the upper limit of this range and the proportion of the sulfate supported inside the porous carrier in the sulfate in this range, the uneven distribution of the sulfate of the alkaline earth metal on the outer surface of the porous carrier can be effectively suppressed. Among such catalyst layers, a catalyst layer in which the total weight of the sulfate of the alkaline earth metal supported by the porous carrier and the sulfate of the alkaline earth metal not supported by the porous carrier is four times or more of the weight of the catalytic metal is used in some embodiments. This is because the actions of both the alkaline earth metal supported by the porous carrier and the alkaline earth metal not supported by the porous carrier as the promotor can be significantly provided to the catalytic metal.

The method for measuring the proportion of the sulfate supported inside the porous carrier in the sulfate of the alkaline earth metal supported by the porous carrier includes a method of measurement through the observation of the catalyst layer by SEM, an electron probe micro analyzer (EPMA), and the like. As another method, the sulfate supported on the outer surface of the porous carrier is dissolved, the weight of the sulfate supported on the outer surface of the porous carrier is measured as the weight of the dissolved material, and the proportion of the sulfate supported inside the porous carrier is calculated from the measured weight of the sulfate supported on the outer surface of the porous carrier and the weight of the sulfate supported by the porous carrier known as the weight of the raw material.

While not specifically limited, the weight per liter of substrate volume of the sulfate of the alkaline earth metal supported by the porous carrier may be, for example, in a range of 1 g/L or more and 6 g/L or less, and is in a range of 2 g/L or more and 4 g/L or less in some embodiments. This is because, the weight equal to or more than the lower limits of these ranges allows sufficiently improving the action as the promotor, and the weight equal to or less than the upper limits of these ranges allows suppressing the usage. The weight per liter of substrate volume of the sulfate of the alkaline earth metal means a value obtained by dividing the weight of the sulfate of the alkaline earth metal contained in the catalyst layer by the volume (unit: liter) of a part in the axial direction of the substrate having the same length in the axial direction as the length in the extending direction of the catalyst layer.

While not specifically limited, the weight per liter of substrate volume of the sulfate of the alkaline earth metal not supported by the porous carrier may be, for example, in a range of 1 g/L or more and 20 g/L or less, and is in a range of 3 g/L or more and 10 g/L or less in some embodiments. This is because, the weight equal to or more than the lower limits of these ranges allows sufficiently improving the action as the promotor, and the weight equal to or less than the upper limits of these ranges allows suppressing the usage.

The catalyst layer may contain various auxiliary ingredients in addition to the porous carrier, the catalytic metal, and the alkaline earth metal. The auxiliary ingredient includes, for example, an OSC material having an Oxygen Storage Capacity (OSC). The OSC material may be, for example, cerium oxide (ceria), zirconium oxide (zirconia), zeolite, ceria-zirconia composite oxide (CZ composite oxide) or the like, and is ceria-zirconia composite oxide or the like in some embodiments. This is because the heat resistance is high, and an advantage in occlusion/discharge rate is provided. The OSC material is usually present as a powder containing OSC material particles.

2. Substrate

As the substrate, various kinds of substrates used in the same kind of device as the exhaust gas purification device according to the embodiment can be used.

The type of the substrate is not specifically limited, and the substrate may have a common shape. For example, a foam shape and a pellet shape are included in addition to the honeycomb substrate. The honeycomb substrate is a substrate in which a frame part and partition walls dividing the space inside the frame part in a honeycomb shape are integrally formed. The shape of the frame part is not specifically limited, and the frame part may have a common shape. For example, an elliptical cylindrical shape and a polygonal tubular shape are included in addition to a cylindrical shape.

The material of the substrate is not specifically limited, and the common material may be used. For example, ceramics, such as cordierite and silicon carbide (SiC) having high heat resistance, and an alloy, such as a stainless steel, are included, and the ceramics are used in some embodiments.

3. Exhaust Gas Purification Device

An exhaust gas purification device includes a substrate and a catalyst layer disposed on the substrate. The exhaust gas purification device is not specifically limited insofar as it is like this. While the exhaust gas purification device may be a straight flow type as the exhaust gas purification device 1 according to the first embodiment, or may be a wall-flow type, the exhaust gas purification device is the straight flow type in some embodiments, and a three-way catalyst may be used. This is because the effect of improving the purification performance is significantly obtained by suppressing the poisoning of the catalyst layer. The wall-flow type includes, for example, a gasoline particulate filter (GPF) and a diesel particulate filter (DPF).

When the exhaust gas purification device is the straight flow type, the plurality of cells defined by the partition walls of the honeycomb substrate are open at both of the flow-in side end and the flow-out side end. When the exhaust gas purification device is the wall-flow type, the plurality of cells defined by the partition walls of the honeycomb substrate include flow-in cells and flow-out cells adjacent across the partition walls, the flow-in cells are open at the flow-in side ends and sealed at the flow-out side ends, and the flow-out cells are sealed at the flow-in side ends and open at the flow-out side ends. The exhaust gas purification device usually further includes sealing members that seal the flow-out side ends of the flow-in cells and the flow-in side ends of the flow-out cells.

While the exhaust gas purification device may be an upstream exhaust gas purification device (start-up catalyst (S/C)) disposed immediately below the engine in an exhaust gas channel, or a downstream exhaust gas purification device (underfloor catalyst (UF/C)) disposed on the downstream side of the upstream exhaust gas purification device, the exhaust gas purification device is an upstream exhaust gas purification device in some embodiments.

In the exhaust gas purification device, the catalyst layer may occupy the entire area in the axial direction of the substrate as the catalyst layer according to the first embodiment, or may occupy a part of the substrate in the axial direction. The catalyst layer is not specifically limited insofar as the catalyst layer is disposed on the substrate, and the catalyst layer may be disposed on the surface of the partition wall of the honeycomb substrate as the catalyst layer according to the first embodiment, or may be disposed inside the partition wall of the honeycomb substrate. The exhaust gas purification device may include a catalyst layer formed of a plurality of layers as the catalyst layer. It is only necessary for the catalyst layer formed of a plurality of layers that any of the layers has the configuration of the catalyst layer described in the section of "1. Catalyst Layer," and other layers may have the configuration different from that of the catalyst layer described in the section of "1. Catalyst Layer."

EXAMPLES

The following further specifically describes the exhaust gas purification device according to the embodiment with examples and comparative examples.
1. Substrate and Catalyst Layer Raw Material of Exhaust Gas Purification Device
(1) Substrate:
    cordierite honeycomb substrate of 875 cc (600 cells, hexagon, wall thickness 2 mil)

(2) Catalyst Layer Raw Material:
a. Material 1 ($Al_2O_3$):
    Powder containing secondary particles of $La_2O_3/Al_2O_3$-composite ($La_2O_3$: 1 weight % to 10 weight %)
b. Material 2 (CZ Composite Oxide 1):
    Powder containing particles of a composite oxide of $ZrO_2$-50 weight %, $CeO_2$-40 weight %, $La_2O_3$-5 weight %, and $Y_2O_3$-5 weight %
c. Material 3 (CZ Composite Oxide 2):
    Powder containing particles of a $CeO_2$—$ZrO_2$ composite oxide ($CeO_2$: 15 weight % to 30 weight %) (which was made highly thermostable with the addition of very small amounts of $La_2O_3$ and $Y_2O_3$.)
d. Material 4 (Palladium Nitrate):
    Powder containing particles of palladium nitrate
e. Material 5 (Chloroplatinic Acid):
    Powder containing particles of chloroplatinic acid
f. Material 6 (Rhodium Nitrate):
    Powder containing particles of rhodium nitrate
g. Material 7 (Barium Sulfate):
    Powder containing secondary particles of barium sulfate
h. Material 8 (Barium Acetate):
    Powder containing secondary particles of barium acetate
i. Material 9 ($Al_2O_3$ Supporting Pd):
    Powder containing secondary particles of $Al_2O_3$ by which Pd particles are supported
j. Material 10 ($Al_2O_3$ Supporting Pd and Barium Sulfate):
    Powder containing secondary particles of $Al_2O_3$ by which Pd particles and secondary particles of barium sulfate are supported
k. Material 11 ($Al_2O_3$ Supporting Pt):
    Powder containing secondary particles of $Al_2O_3$ by which Pt particles are supported
l. Material 12 ($Al_2O_3$ Supporting Pt and Barium Sulfate):
    Powder containing secondary particles of $Al_2O_3$ by which Pt particles and secondary particles of barium sulfate are supported
2. Production of Exhaust Gas Purification Device Comparative Example 1

First, the material 1 and the material 4 were mixed to a distilled water while stirring them, water was dissipated by a dryer kept at 120° C. for two hours, and subsequently, the resultant was calcined in an electric furnace at 500° C. for two hours, thus preparing the material 9.

Subsequently, the material 9, the material 2, the material 7, and an $Al_2O_3$-based binder were added to a distilled water while stirring them, thus preparing a suspended slurry.

Subsequently, the slurry was poured into the cells of the substrate, and an unnecessary portion was blown off by a blower to coat the cell side surface of the partition wall of the substrate with the material of the catalyst layer, thus preparing a precursor layer of the catalyst layer. At this time, the weight of the material 9 was set to 31 g/L per liter of substrate volume in the precursor layer of the catalyst layer, thereby setting the weight of the material 1 ($Al_2O_3$ weight) to 30 g/L per liter of substrate volume and setting the weight of the material 4 in terms of Pd (supported noble metal weight) to 1 g/L per liter of substrate volume as illustrated in Table 1 below. As illustrated in Table 1 below, the weight of the material 2 (OSC material weight) was set to 50 g/L per liter of substrate volume, and the weight of the material 7 (unsupported barium sulfate weight) was set to 2.5 g/L per liter of substrate volume. Furthermore, a coat width of the precursor layer of the catalyst layer was set to occupy the entire area in the axial direction (partition wall extending direction) of the substrate.

Finally, the catalyst layer was formed on the cell side surface of the partition wall of the substrate by dissipating water by the dryer kept at 120° C. for two hours, and subsequently calcining the resultant in the electric furnace at 500° C. for two hours, thus producing the exhaust gas purification device.

Comparative Example 2

The exhaust gas purification device was produced similarly to Comparative Example 1 except that the slurry was prepared such that the weight of the material 7 (unsupported barium sulfate weight) became 5 g/L per liter of substrate volume in the precursor layer of the catalyst layer as illustrated in Table 1 below, thus preparing the precursor layer of the catalyst layer.

Comparative Example 3

The exhaust gas purification device was produced similarly to Comparative Example 1 except that the slurry was prepared such that the weight of the material 7 (unsupported barium sulfate weight) became 10 g/L per liter of substrate volume in the precursor layer of the catalyst layer as illustrated in Table 1 below, thus preparing the precursor layer of the catalyst layer.

Comparative Example 4

First, the material 1, the material 4, and the material 8 were mixed while stirring them, and subsequently, ammonium sulphate was further added to convert barium acetate of the material 8 to barium sulfate. Subsequently, after dissipating water by the dryer kept at 120° C. for two hours, the resultant was calcined in the electric furnace at 500° C. for two hours, thus preparing the material 10.

Subsequently, the material 10, the material 2, and the $Al_2O_3$-based binder were added to a distilled water while stirring them, thus preparing a suspended slurry.

Subsequently, the slurry was poured into the cells of the substrate, and an unnecessary portion was blown off by the blower to coat the cell side surface of the partition wall of the substrate with the material of the catalyst layer, thus preparing a precursor layer of the catalyst layer. At this time, the weight of the material 10 was set to 33.4 g/L per liter of substrate volume in the precursor layer of the catalyst layer, thereby setting the weight of the material 1 ($Al_2O_3$ weight) to 30 g/L per liter of substrate volume, setting the weight of the material 4 in terms of Pd (supported noble metal weight) to 1 g/L per liter of substrate volume, and setting the weight of the material 8 in terms of barium sulfate (supported barium sulfate weight) to 2.4 g/L per liter of substrate volume as illustrated in Table 1 below. As illustrated in Table 1 below, the weight of the material 2 (OSC material weight) was set to 50 g/L per liter of substrate volume. Furthermore, a coat width of the precursor layer of the catalyst layer was set to occupy the entire area in the axial direction (partition wall extending direction) of the substrate.

Finally, the catalyst layer was formed on the cell side surface of the partition wall of the substrate by dissipating water by the dryer kept at 120° C. for two hours, and subsequently calcining the resultant in the electric furnace at 500° C. for two hours, thus producing the exhaust gas purification device.

Comparative Example 5

The exhaust gas purification device was produced similarly to Comparative Example 4 except that the material 10 was prepared such that the weight of the material 8 in terms of barium sulfate (supported barium sulfate weight) became 3.8 g/L per liter of substrate volume in the precursor layer of the catalyst layer as illustrated in Table 1 below, thus preparing the precursor layer of the catalyst layer.

Comparative Example 6

The exhaust gas purification device was produced similarly to Comparative Example 4 except that the material 10 was prepared such that the weight of the material 8 in terms of barium sulfate (supported barium sulfate weight) became 4.8 g/L per liter of substrate volume in the precursor layer of the catalyst layer as illustrated in Table 1 below, thus preparing the precursor layer of the catalyst layer.

Comparative Example 7

The exhaust gas purification device was produced similarly to Comparative Example 4 except that the material 10 was prepared such that the weight of the material 8 in terms of barium sulfate (supported barium sulfate weight) became 10 g/L per liter of substrate volume in the precursor layer of the catalyst layer as illustrated in Table 1 below, thus preparing the precursor layer of the catalyst layer.

Example 1

First, the material 1, the material 4, and the material 8 were mixed while stirring them, and subsequently, ammonium sulphate was further added to convert barium acetate of the material 8 to barium sulfate. Subsequently, after dissipating water by the dryer kept at 120° C. for two hours, the resultant was calcined in the electric furnace at 500° C. for two hours, thus preparing the material 10.

Subsequently, the material 10, the material 2, the material 7, and the $Al_2O_3$-based binder were added to a distilled water while stirring them, thus preparing a suspended slurry.

Subsequently, the slurry was poured into the cells of the substrate, and an unnecessary portion was blown off by the blower to coat the cell side surface of the partition wall of the substrate with the material of the catalyst layer, thus preparing a precursor layer of the catalyst layer. At this time, the weight of the material 10 was set to 33.4 g/L per liter of substrate volume in the precursor layer of the catalyst layer, thereby setting the weight of the material 1 ($Al_2O_3$ weight) to 30 g/L per liter of substrate volume, setting the weight of the material 4 in terms of Pd (supported noble metal weight) to 1 g/L per liter of substrate volume, and setting the weight of the material 8 in terms of barium sulfate (supported barium sulfate weight) to 2.4 g/L per liter of substrate volume as illustrated in Table 1 below. As illustrated in Table 1 below, the weight of the material 2 (OSC material weight) was set to 50 g/L per liter of substrate volume, and the weight of the material 7 (unsupported barium sulfate weight) was set to 7.6 g/L per liter of substrate volume. Furthermore, a coat width of the precursor layer of the catalyst layer was set to occupy the entire area in the axial direction (partition wall extending direction) of the substrate.

Finally, the catalyst layer was formed on the cell side surface of the partition wall of the substrate by dissipating water by the dryer kept at 120° C. for two hours, and subsequently calcining the resultant in the electric furnace at 500° C. for two hours, thus producing the exhaust gas purification device.

Example 2

The exhaust gas purification device was produced similarly to Example 1 except that the slurry was prepared such that the weight of the material 7 (unsupported barium sulfate weight) became 2.6 g/L per liter of substrate volume in the precursor layer of the catalyst layer as illustrated in Table 1 below, thus preparing the precursor layer of the catalyst layer.

Example 3

The exhaust gas purification device was produced similarly to Example 1 except that the slurry was prepared such that the weight of the material 7 (unsupported barium sulfate weight) became 1.6 g/L per liter of substrate volume in the precursor layer of the catalyst layer as illustrated in Table 1 below, thus preparing the precursor layer of the catalyst layer.

Example 4

The exhaust gas purification device was produced similarly to Example 1 except that the material 10 and the slurry were prepared such that the weight of the material 8 in terms of barium sulfate (supported barium sulfate weight) became 3.8 g/L per liter of substrate volume and the weight of the material 7 (unsupported barium sulfate weight) became 6.2 g/L per liter of substrate volume in the precursor layer of the catalyst layer as illustrated in Table 1 below, thus preparing the precursor layer of the catalyst layer.

Example 5

First, the material 12 was prepared similarly to the material 10 except that the material 5 was mixed instead of the material 4.

Subsequently, the slurry was prepared similarly to Example 1 except that the material 12 was added to the distilled water instead of the material 10.

Subsequently, the precursor layer of the catalyst layer was prepared similarly to Example 1 except that the weight of the material 12 instead of the weight of the material 10 was set to 33.4 g/L per liter of substrate volume in the precursor layer of the catalyst layer, thereby preparing the precursor layer of the catalyst layer such that the weight of the material 5 in terms of Pt (supported noble metal weight) instead of the weight of the material 4 in terms of Pd became 1 g/L per liter of substrate volume as illustrated in Table 1 below.

Finally, the catalyst layer was formed by dissipating water and subsequently calcining the resultant similarly to Example 1, thus producing the exhaust gas purification device.

Comparative Example 8

First, the material 11 was prepared similarly to the material 9 except that the material 5 was mixed to the distilled water instead of the material 4.

Subsequently, the slurry was prepared similarly to Comparative Example 3 except that the material 11 was added to the distilled water instead of the material 9.

Subsequently, the precursor layer of the catalyst layer was prepared similarly to Comparative Example 3 except that the weight of the material 11 instead of the weight of the material 9 was set to 31 g/L per liter of substrate volume in the precursor layer of the catalyst layer, thereby preparing the precursor layer of the catalyst layer such that the weight of the material 5 in terms of Pt (supported noble metal weight) instead of the weight of the material 4 in terms of Pd became 1 g/L per liter of substrate volume as illustrated in Table 1 below.

Finally, the catalyst layer was formed by dissipating water and subsequently calcining the resultant similarly to Comparative Example 1, thus producing the exhaust gas purification device.

Example 6

First, the catalyst layer which is the same as that of Example 1 was formed as a first catalyst layer on the cell side surface of the partition wall of the substrate. Subsequently, a second catalyst layer was formed.

Specifically, first, the material 1, the material 3, the material 6, and the $Al_2O_3$-based binder were added to a distilled water while stirring them, thus preparing a suspended slurry.

Subsequently, the slurry was poured into the cells of the substrate after forming the first catalyst layer, and an unnecessary portion was blown off by the blower to coat the cell side surface of the first catalyst layer of the partition wall of the substrate with the material of the second catalyst layer, thus preparing a precursor layer of the second catalyst layer. In the precursor layer of the second catalyst layer, the weight of the material 1 ($Al_2O_3$ weight) was set to 30 g/L per liter of substrate volume, the weight of the material 3 (OSC material weight) was set to 50 g/L per liter of substrate volume, and the weight of the material 6 in terms of Rh (supported noble metal weight) was set to 0.3 g/L per liter of substrate volume as illustrated in Table 1. Furthermore, a coat width of the precursor layer of the second catalyst layer was set to occupy the entire area in the axial direction (partition wall extending direction) of the substrate.

Finally, the second catalyst layer was formed on the cell side surface of the first catalyst layer of the partition wall of the substrate by dissipating water by the dryer kept at 120° C. for two hours, and subsequently calcining the resultant in the electric furnace at 500° C. for two hours, thus producing the exhaust gas purification device.

Comparative Example 9

First, the catalyst layer which is the same as that of Comparative Example 3 was formed as a first catalyst layer on the cell side surface of the partition wall of the substrate. Subsequently, a second catalyst layer which is the same as that of Example 6 was formed on the cell side surface of the first catalyst layer of the partition wall of the substrate. Thus, the exhaust gas purification device was produced.

3. Durability Test

The durability test was performed for the respective exhaust gas purification devices of the comparative examples and the examples using an actual engine. Specifically, the durability test was performed as follows. The exhaust gas purification devices were each installed to an exhaust system of a V-type eight-cylinder engine, exhaust gases in respective stoichiometric and lean atmospheres were repeatedly flown for a certain period of time (a ratio of 3:1) at a catalyst bed temperature of 900° C. for 50 hours.

4. Performance Evaluation

For the respective exhaust gas purification devices of the comparative examples and the examples subjected to the durability test, the performance evaluation was performed using an actual engine. Specifically, the exhaust gas purification devices were each installed to an exhaust system of an L-type four-cylinder engine, and an exhaust gas with A/F (air-fuel ratio) of 14.4 and an exhaust gas with A/F of 15.1 were alternately supplied by switching every 10 minutes at an inlet gas temperature of 500° C., thus evaluating the NOx conversion rate at Ga=30 g/s. In this respect, in the rich (A/F=14.4) atmosphere at the fourth switching, the NOx conversion rate for 10 seconds after the elapse of nine minutes and 45 seconds was averaged, thus calculating the NOx conversion rate in the rich atmosphere.

Figure 3:
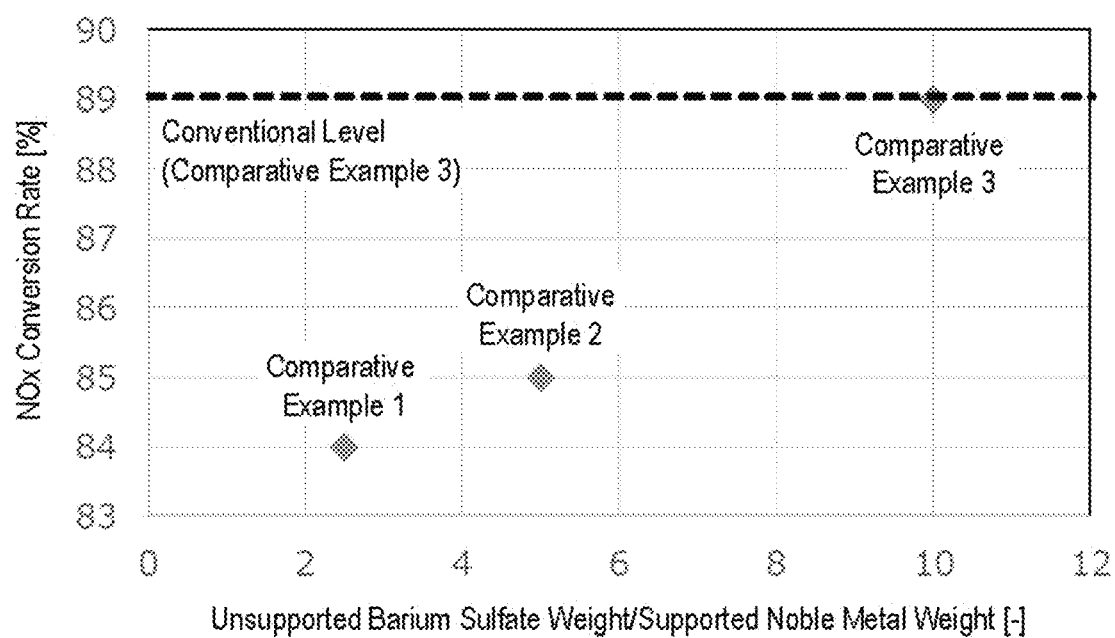
FIG. 3 is a graph illustrating an NOx conversion rate relative to unsupported barium sulfate weight (weight of barium sulfate secondary particles not supported by $Al_2O_3$ secondary particles)/supported noble metal weight (weight of Pd particles supported by $Al_2O_3$ secondary particles) in catalyst layers of respective exhaust gas purification devices of Comparative Examples 1 to 3.
Figure 4:
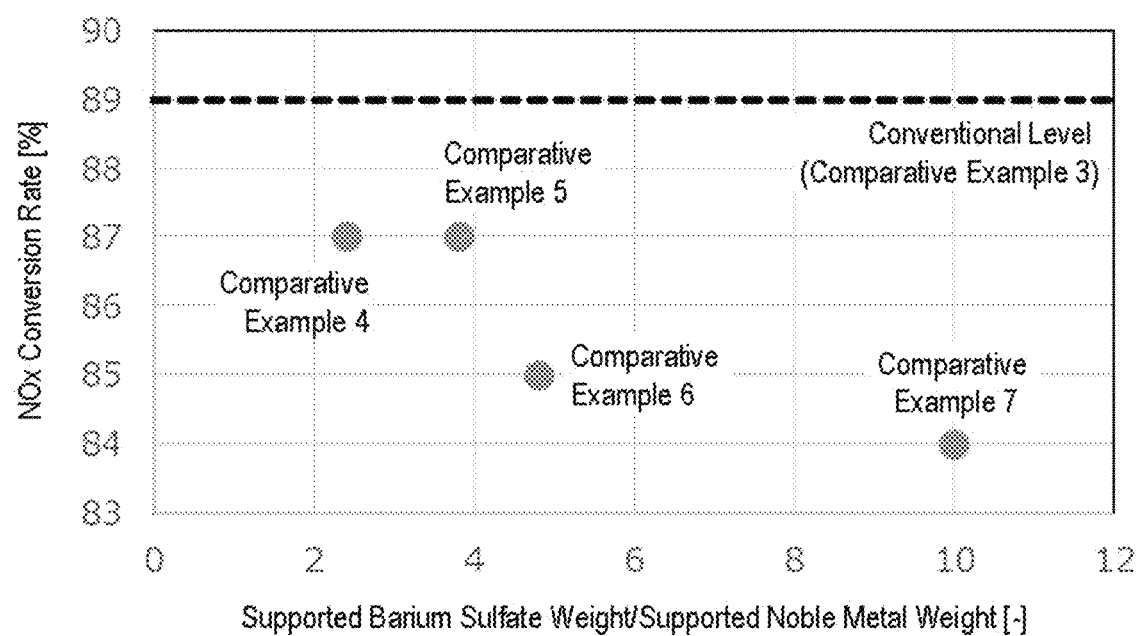
FIG. 4 is a graph illustrating an NOx conversion rate relative to supported barium sulfate weight (weight of barium sulfate secondary particles supported by $Al_2O_3$ secondary particles)/supported noble metal weight (weight of Pd particles supported by $Al_2O_3$ secondary particles) in catalyst layers of respective exhaust gas purification devices of Comparative Examples 4 to 7.
Figure 5:
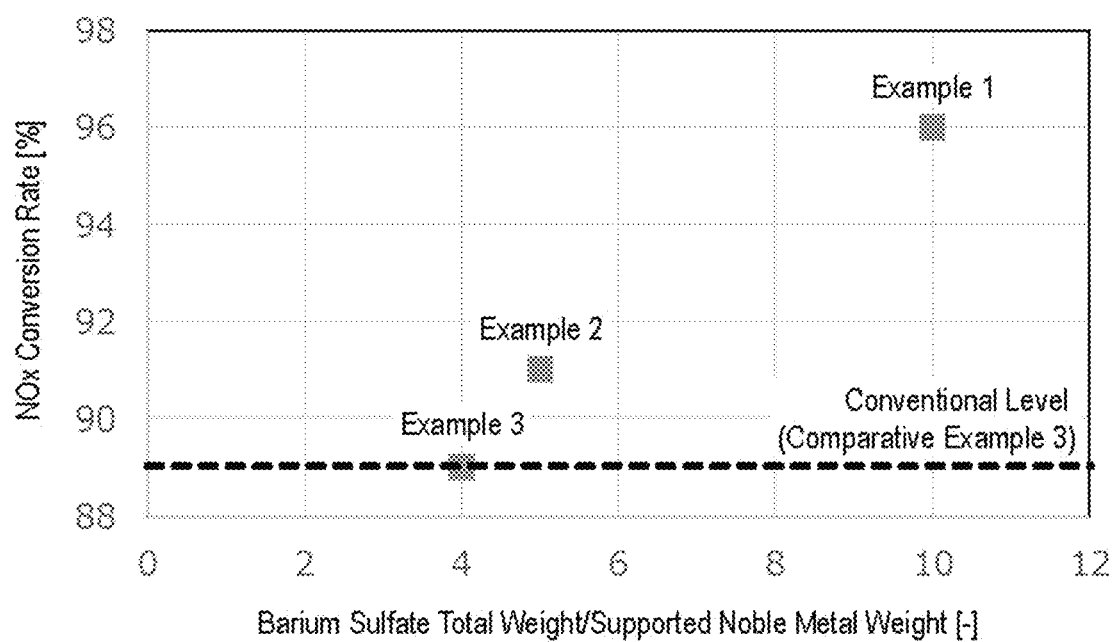
FIG. 5 is a graph illustrating an NOx conversion rate relative to barium sulfate total weight/supported noble metal weight (total weight of barium sulfate secondary particles supported by $Al_2O_3$ secondary particles and barium sulfate secondary particles not supported by $Al_2O_3$ secondary particles/weight of Pd particles supported by $Al_2O_3$ secondary particles) in catalyst layers of respective exhaust gas purification devices of Examples 1 to 3.

Table 1 below illustrates the NOx conversion rates of the respective exhaust gas purification devices in the comparative examples and the examples together with the configurations of the catalyst layers of the respective exhaust gas purification devices in the comparative examples and the examples. A supported barium sulfate internally supported proportion (proportion of barium sulfate secondary particles supported inside $Al_2O_3$ secondary particles in barium sulfate secondary particles supported by $Al_2O_3$ secondary particles) was measured through the observation of the catalyst layer by EPMA. FIG. 3 is a graph illustrating the NOx conversion rate relative to unsupported barium sulfate weight (weight of barium sulfate secondary particles not supported by $Al_2O_3$ secondary particles)/supported noble metal weight (weight of Pd particles supported by $Al_2O_3$ secondary particles) in the catalyst layer of each exhaust gas purification device of Comparative Examples 1 to 3. FIG. 4 is a graph illustrating the NOx conversion rate relative to supported barium sulfate weight (weight of barium sulfate secondary particles supported by $Al_2O_3$ secondary particles)/supported noble metal weight (weight of Pd particles supported by $Al_2O_3$ secondary particles) in the catalyst layer of each exhaust gas purification device of Comparative Examples 4 to 7. FIG. 5 is a graph illustrating the NOx conversion rate relative to barium sulfate total weight (total weight of barium sulfate secondary particles supported by $Al_2O_3$ secondary particles and barium sulfate secondary particles not supported by $Al_2O_3$ secondary particles)/supported noble metal weight (weight of Pd particles supported by $Al_2O_3$ secondary particles) in the catalyst layer of each exhaust gas purification device of Examples 1 to 3.

TABLE 1

| | Catalyst Layer (First Catalyst Layer) | | | | | |
|---|---|---|---|---|---|---|
| | $Al_2O_3$ Weight [g/L] | OSC Material Weight [g/L] | Supported Noble Metal Weight [g/L] | Supported Barium Sulfate Weight [g/L] | Supported Barium Sulfate Weight Ratio [weight %] | Supported Barium Sulfate Internally Supported Proportion [weight %] |
| Comparative Example 1 | 30 | 50 | Pd: 1 | 0 | 0 | — |
| Comparative Example 2 | 30 | 50 | Pd: 1 | 0 | 0 | — |
| Comparative Example 3 | 30 | 50 | Pd: 1 | 0 | 0 | — |
| Comparative Example 4 | 30 | 50 | Pd: 1 | 2.4 | 7.19 | 100 |
| Comparative Example 5 | 30 | 50 | Pd: 1 | 3.8 | 10.92 | 70 |
| Comparative Example 6 | 30 | 50 | Pd: 1 | 4.8 | 13.41 | 50 |
| Comparative Example 7 | 30 | 50 | Pd: 1 | 10 | 24.39 | 24 |
| Example 1 | 30 | 50 | Pd: 1 | 2.4 | 7.19 | 100 |
| Example 2 | 30 | 50 | Pd: 1 | 2.4 | 7.19 | 100 |
| Example 3 | 30 | 50 | Pd: 1 | 2.4 | 7.19 | 100 |
| Example 4 | 30 | 50 | Pd: 1 | 3.8 | 10.92 | 70 |
| Example 5 | 30 | 50 | Pt: 1 | 2.4 | 7.19 | 100 |
| Comparative Example 8 | 30 | 50 | Pt: 1 | 0 | 0 | — |
| Example 6 | 30 | 50 | Pd: 1 | 2.4 | 7.19 | 100 |
| Comparative Example 9 | 30 | 50 | Pd: 1 | 0 | 0 | — |

| | Catalyst Layer (First Catalyst Layer) | | Second Catalyst Layer | | | |
|---|---|---|---|---|---|---|
| | Unsupported Barium Sulfate Weight [g/L] | Barium Sulfate Total Weight/ Supported Noble Metal Weight [–] | $Al_2O_3$ Weight [g/L] | OSC Material Weight [g/L] | Supported Noble Metal Weight [g/L] | NOx conversion rate [%] |
| Comparative Example 1 | 2.5 | 2.5 | — | | | 84 |
| Comparative Example 2 | 5 | 5 | — | | | 85 |
| Comparative Example 3 | 10 | 10 | — | | | 89 |

TABLE 1-continued

| | | | | | | |
|---|---|---|---|---|---|---|
| Comparative Example 4 | 0 | 2.4 | | | — | 87 |
| Comparative Example 5 | 0 | 3.8 | | | — | 87 |
| Comparative Example 6 | 0 | 4.8 | | | — | 85 |
| Comparative Example 7 | 0 | 10 | | | — | 84 |
| Example 1 | 7.6 | 10 | | | — | 96 |
| Example 2 | 2.6 | 5 | | | — | 91 |
| Example 3 | 1.6 | 4 | | | — | 89 |
| Example 4 | 6.2 | 10 | | | — | 95 |
| Example 5 | 7.6 | 10 | | | — | 96 |
| Comparative Example 8 | 10 | 10 | | | — | 88 |
| Example 6 | 7.6 | 10 | 30 | 98 | Rh: 0.3 | 98 |
| Comparative Example 9 | 10 | 10 | 30 | 92 | Rh: 0.3 | 92 |

In the comparison among Comparative Examples 1 to 3 where the catalyst layer contains the barium sulfate secondary particles (sulfate of Ba) not supported by the $Al_2O_3$ secondary particles (porous carrier) and does not contain the barium sulfate secondary particles supported by the $Al_2O_3$ secondary particles, as illustrated in Table 1 and FIG. 3, as the unsupported barium sulfate weight increases, the NOx conversion rate increases.

In the comparison between Comparative Example 1 among these and Comparative Example 4 among Comparative Examples 4 to 7 in which the catalyst layer contains the barium sulfate secondary particles supported by the $Al_2O_3$ secondary particles and does not contain the barium sulfate secondary particles not supported by the $Al_2O_3$ secondary particles, as illustrated in Table 1, FIG. 3, and FIG. 4, the NOx conversion rate is definitely high in Comparative Example 4 compared with Comparative Example 1 even though the unsupported barium sulfate weight of Comparative Example 1 and the supported barium sulfate weight of Comparative Examples 4 are mutually in the same degree. This is considered because the barium sulfate secondary particles supported by the $Al_2O_3$ secondary particles can effectively provide the action as the promotor to the Pd particles (catalytic metal) supported by the $Al_2O_3$ secondary particles compared with the barium sulfate secondary particles not supported by the $Al_2O_3$ secondary particles.

However, in the comparison among Comparative Examples 4 to 7, as illustrated in Table 1 and FIG. 4, the NOx conversion rate decreases as the supported barium sulfate weight increases. Meanwhile, as illustrated in Table 1, as the supported barium sulfate weight increases, the supported barium sulfate internally supported proportion (proportion of barium sulfate secondary particles supported inside $Al_2O_3$ secondary particles in barium sulfate secondary particles supported by $Al_2O_3$ secondary particles) decreases. Accordingly, it is considered that in Comparative Examples 4 to 7, the increase of the supported barium sulfate weight causes the uneven distribution of the barium sulfate secondary particles on the outer surfaces of the $Al_2O_3$ secondary particles, and consequently, the constituent material and the catalytic metal degrade in association with the decrease in heat resistance of the constituent material, such as an OSC material, of the catalyst layer, thus reducing the conversion performance.

In contrast, in Examples 1 to 4 in which the supported barium sulfate weight ratio (weight ratio of the barium sulfate secondary particles supported by $Al_2O_3$ secondary particles relative to total weight of $Al_2O_3$ secondary particles, Pd particles supported by $Al_2O_3$ secondary particles, and barium sulfate secondary particles supported by $Al_2O_3$ secondary particles) is in a range of 7 weight % or more and 11 weight % or less, the supported barium sulfate internally supported proportion is in a range of 70 weight % or more, and barium sulfate total weight/supported noble metal weight (total weight of barium sulfate secondary particles supported by $Al_2O_3$ secondary particles and barium sulfate secondary particles not supported by $Al_2O_3$ secondary particles/weight of Pd particles supported by $Al_2O_3$ secondary particles) is 4 or more, the NOx conversion rate is 89% or more as the conventional level (Comparative Example 3). It is considered that the uneven distribution of the barium sulfate secondary particles on the outer surfaces of the $Al_2O_3$ secondary particles can be effectively suppressed, and the actions as the promotors of both the barium sulfate secondary particles supported by the $Al_2O_3$ secondary particles and the barium sulfate secondary particles not supported by the $Al_2O_3$ secondary particles are significantly provided to the Pd particles, thereby allowing the especially effective suppression of the HC poisoning.

Furthermore, also in Example 5 in which the catalyst layer contains the Pt particles instead of the Pd particles, as illustrated in Table 1, the NOx conversion rate is high similarly to Example 1. Also in Example 6 in which the catalyst layer which is the same as that of Example 1 is used as the first catalyst layer and the second catalyst layer is used together, as illustrated in Table 1, the effect of increasing the NOx conversion rate is provided.

While the embodiment according to the present disclosure has been described in detail above, the present disclosure is not limited thereto, and can be subjected to various kinds of changes in design without departing from the spirit or scope of the present disclosure described in the claims.

All publications, patents and patent applications cited in the present description are herein incorporated by reference as they are.

DESCRIPTION OF SYMBOLS

1 Exhaust gas purification device
10 Honeycomb substrate (substrate)
20 Catalyst layer
2 Porous carrier secondary particle (porous carrier)
2n Inside
2s Outer surface
4 Catalyst metal particle (catalytic metal belonging to platinum group)

6 Barium sulfate secondary particle supported by porous carrier secondary particle (sulfate of Ba)
6n Barium sulfate secondary particle supported inside
6s Barium sulfate secondary particle supported on outer surface
26 Barium sulfate secondary particle not supported by porous carrier secondary particle (sulfate of Ba)

What is claimed is:

1. An exhaust gas purification device comprising:
a substrate; and
a catalyst layer disposed on the substrate,
wherein the catalyst layer contains a porous carrier, a catalytic metal that is supported by the porous carrier and belongs to platinum group, a first group of an alkaline earth metal supported by the porous carrier, and a second group of an alkaline earth metal not supported by the porous carrier, and
wherein at least a part of the first group of the alkaline earth metal supported by the porous carrier is supported inside the porous carrier;
wherein the catalyst layer contains the first group of the alkaline earth metal supported by the porous carrier as a sulfate of the first group of the alkaline earth metal supported by the porous carrier, and contains the second group of the alkaline earth metal not supported by the porous carrier as a sulfate of the second group of the alkaline earth metal not supported by the porous carrier;
wherein each of the sulfates of the first and second groups of the alkaline earth metals is a sulfate of Ba;
wherein a weight ratio of the first group of the sulfate of the alkaline earth metal supported by the porous carrier relative to a total weight of the porous carrier, the catalytic metal, and the sulfate of the first group of the alkaline earth metal supported by the porous carrier is in a range of 7 weight % or more and 11 weight % or less,
wherein a proportion of the sulfate supported inside the porous carrier in the sulfate of the first group of the alkaline earth metal supported by the porous carrier is in a range of 70 weight % or more, and
wherein a total weight of the sulfate of the first group of the alkaline earth metal supported by the porous carrier and the sulfate of the second group of the alkaline earth metal not supported by the porous carrier is four times or more of a weight of the catalytic metal.

* * * * *